United States Patent [19]
Hudson, Jr.

[11] Patent Number: 5,705,250
[45] Date of Patent: Jan. 6, 1998

[54] RESILIENT SHOCK RESISTANT CERAMIC PANEL

[76] Inventor: Thomas C. Hudson, Jr., 3368 Faring Rd., Birmingham, Ala. 35223

[21] Appl. No.: 482,911

[22] Filed: Jun. 8, 1995

Related U.S. Application Data

[63] Continuation-in-part of Ser. No. 82,787, Jun. 28, 1993, abandoned.

[51] Int. Cl.⁶ .................................................. B32B 3/06
[52] U.S. Cl. .......................... 428/99; 52/309.3; 52/309.9; 52/388; 415/170.1; 415/196; 415/197; 428/44; 428/49; 428/53; 428/179
[58] Field of Search ........................ 428/44, 49, 53, 428/179, 99; 52/309.3, 309.9, 388; 415/170.1, 196, 197

[56] References Cited

U.S. PATENT DOCUMENTS

| | | | |
|---|---|---|---|
| 3,353,315 | 11/1967 | Barker | 52/275 |
| 3,607,606 | 9/1971 | Beninga | 428/67 |
| 3,624,344 | 11/1971 | Kutzer | 219/127 |
| 3,646,180 | 2/1972 | Winnick | 428/49 |
| 3,928,691 | 12/1975 | Knudson | 428/53 |
| 4,042,746 | 8/1977 | Hofer | 428/311 |
| 4,120,605 | 10/1978 | Hurst | 428/250 |

FOREIGN PATENT DOCUMENTS

| | | |
|---|---|---|
| 0 213 282 A2 | 5/1986 | Germany. |
| 2107288 | 4/1983 | United Kingdom. |

Primary Examiner—Nasser Ahmad
Attorney, Agent, or Firm—Veal & Associates

[57] ABSTRACT

A wear and shock resistant ceramic-cored composite panel (11) for use in equipment exposed to heavy abrasive materials comprising a plurality of commensurately shaped generally planar layers. The layers are comprised of and sequentially arranged in the following order: a ceramic layer (12); a first fiberglass reinforced plastic composite layer (13); a resilient core layer for absorbing impact energy imparted indirectly thereto by the heavy abrasive materials (14); and a second fiberglass reinforced plastic composite layer (16), wherein the layers are consecutively bonded together in the order set out above by an adhesive, then secured to various sites of wear inside equipment by known types of attachment or utilized as structural members themselves.

4 Claims, 5 Drawing Sheets

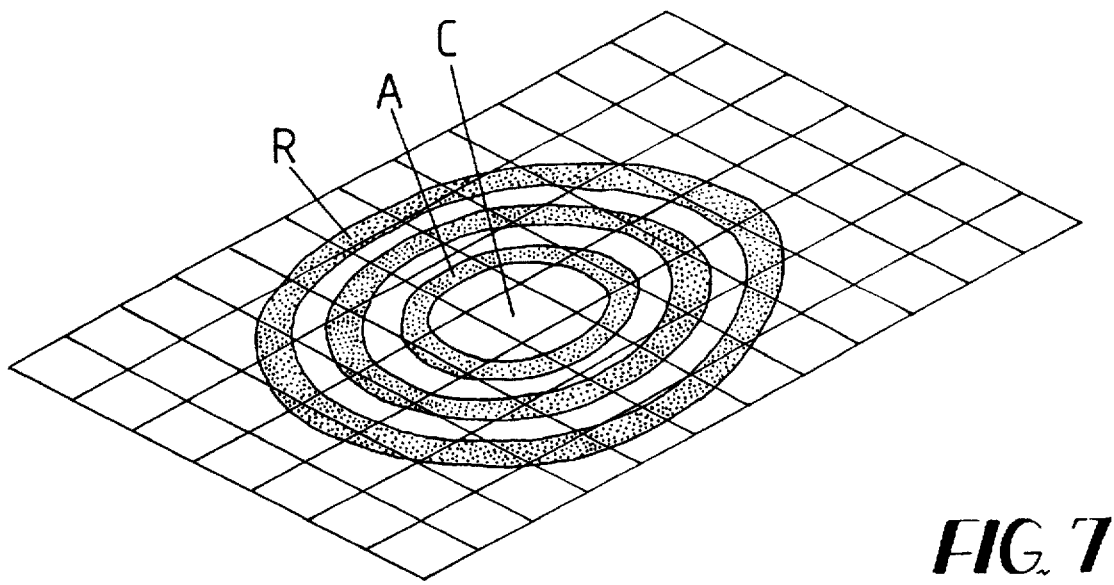
FIG. 7
FIG. 6
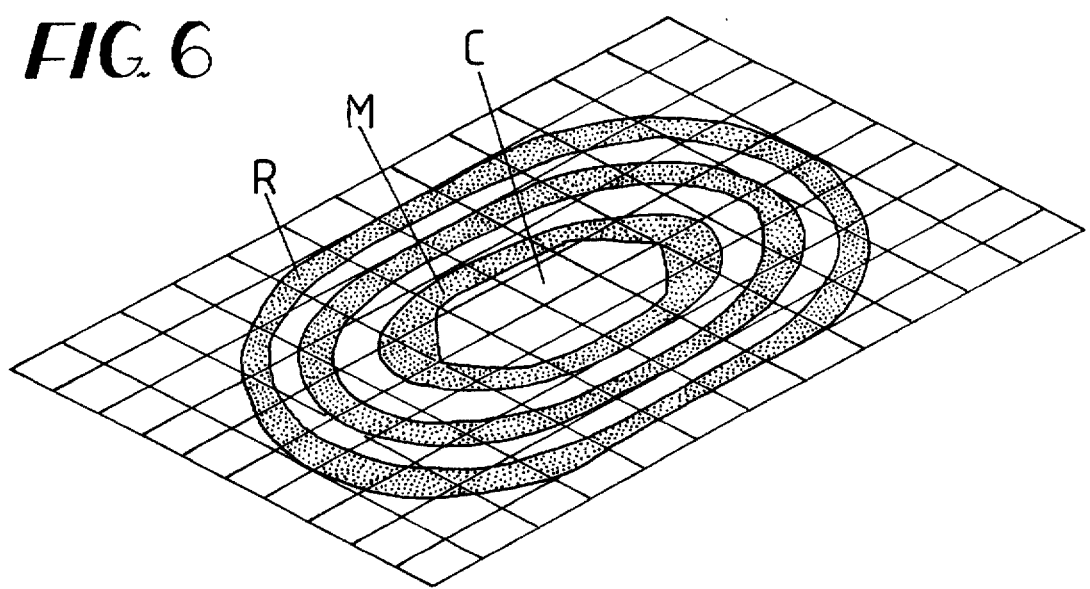

RESILIENT SHOCK RESISTANT CERAMIC PANEL

This is a continuation-in-part of U.S. patent application Ser. No. 08/082,787, filed Jun. 28, 1993, now abandoned.

FIELD OF THE INVENTION

The present invention relates to equipment including but not limited to chutes, conveyors, tanks, cyclone-type separation devices, fan housings, guides and hoppers which are exposed to abrasive materials. More particularly, the present invention relates to a wear and shock resistant ceramic-cored composite member made from layers of advanced ceramic; a lightweight, energy absorbing structural core such as, but not limited to, polyvinyl chloride (PVC), polyethylene, polyurethane, rubber, wood, paper, and polystyrene (styrofoam); and fiberglass reinforced plastic (hereinafter "FRP") composites to yield a panel capable of withstanding structural loading and having greatly extended wear life, improved impact resistance, insulation, and noise reduction characteristics. In even greater particularity, the present invention may be described as a ceramic-cored composite comprising ceramic layer adhesively bonded to two FRP composite layers having lightweight, resilient core there between.

BACKGROUND

Presently, ceramic liners are used in equipment which handle abrasive materials since it is well known in the art that ceramic provides greater wear or abrasion resistance when compared to traditional metal parts. Such resistance is based in part on the fact that ceramics are much harder In response to the above deficiency, various attempts have been made to improve on the impact resistance of ceramic wear liners. Interestingly, instead of using ceramic as the major base component of the wear liner, the current state of art is to embed pieces of wear resistant material (i.e., ceramic) into a resilient rubber material which constitutes the majority of the material in the liner. Inventions along this line allegedly accommodate most impact energies encountered in their operation, yet subject themselves once again to unacceptable wearing due to the abrasive materials acting directly on the rubber around the pieces of wear-resistant material. Furthermore, since these type inventions are comprised mostly of a rubber base layer, they are prevented from functioning as structural members and unfortunately require attachment to some type of metal or structural backing.

To illustrate, U.S. Pat. No. 3,607,606 discloses a base layer of rubber having 1-inch square pieces of ceramic embedded therein, the primary purpose being to have a flexible wear-resistant composite liner. However, even though the above invention may have adequate impact resistance, it has limited application in the abrasive material handling equipment industry for at least two reasons.

First, it is known that the rubber tends to wear out from around the ceramic pieces embedded therein at an alarmingly fast rate exposing and even dislodging the ceramic pieces. This results in increased down-time, maintenance and replacement costs of the equipment involved. Recognizing this problem, an attempt to reduce the wear rate of rubber was disclosed in U.S. Pat. No. 4,120,605. That patent embedded one or more sheets of carbon steel wire mesh in the rubber layer. The idea was that the rubber will be worn down to the wire mesh, but will not continue to the rubber beyond the mesh until the latter is worn through. However, once down to the wire mesh, that invention is back to the initial problem of a metal part wearing faster than a ceramic. Moreover, it is noted that the above two patents neither singularly or in combination teach, suggest nor provide an incentive for combining their efforts.

Second, the layer of natural or synthetic rubber used in U.S. Pat. No. 4,120,605 possesses relatively poor insulation characteristics. The neglect of this very important factor proves to be costly when the invention is used in real life situations. For example, when rubber based wear liners, such as those described in the above patents, are used in gravity flow chutes which are typically found in coal preparation plants and coal fueled generation plants, expensive radiant heaters must also be used in conjunction therewith to prevent moist product from freezing to and accumulating on the surface of the chute, thus interrupting production. If radiant heaters were not used, the resiliency of the rubber would be reduced dramatically since rubber tends to loose its resilience in adverse weather conditions. Hence, such invention would become inoperable if exposed to freezing weather without the assistance of radiant heaters.

Therefore, what is lacking in the art is a ceramic composite that has the impact resistance of rubber-ceramic composites, yet possesses superior structural, insulation and noise reduction characteristics, thus eliminating the need for radiant heaters if adverse weather conditions exist. While the above-mentioned inventions are allegedly suited for their intended purpose, none of them disclose a ceramic-cored composite member made from layers of advanced ceramic; an energy absorbing core; and FRP to yield a part capable of withstanding structural loading and having greatly extended wear life and superior impact, insulation and noise reduction characteristics. In addition, none of the ceramic composites present in the art include a ceramic layer attached to two FRP composite layers having an energy absorbing, insulative structural core therebetween. Inasmuch as the art is relatively crowded with respect to these various types of conventional rubber-ceramic composites, it can be appreciated that there is a continuing need for and interest in improvements to the structural integrity, wear resistance, impact, insulation and noise reduction characteristics of such composites, and in this respect, the present invention addresses this need and interest.

SUMMARY OF THE INVENTION

In view of the foregoing disadvantages inherent in the known types of ceramic and rubber-ceramic composite wear liners now present in the art, the present invention provides a new and improved ceramic-cored composite having novel impact, insulation and noise reduction characteristics for use in equipment that handles abrasive materials. As such, the principal object of the present invention is to provide a new and improved ceramic-cored composite that is capable of withstanding, either singularly or in combination with a metal underlayment, considerable impact energies and vibrations, yet will provide excellent insulation and noise reduction characteristics.

In support of the principal object, another object of the present invention is to provide a new and improved ceramic-cored composite that is capable of transferring dynamic loading over a greater surface area than conventional rubber-ceramic composites thus reducing concentrations of stress in the area of impact.

In further support of the principal object, an additional object of the present invention is to provide a new and improved ceramic-cored composite that, when applied to a worn component exposed to adverse weather conditions, will enable the component to require less externally supplied radiant energy for continued operation since the present invention acts as an insulator and does not conduct away thermal energy.

Another object of the present invention is to provide a new and improved ceramic-cored composite that has all the advantages of prior art rubber-ceramic composite wear liners and none of the disadvantages.

It is another object of the present invention to provide a panel of durable and reliable construction and capable of singularly withstanding structural loading and does not rely on the stiffness and rigidity of the planar surface of equipment in which it is installed.

Even still another object of the present invention is to provide a new and improved ceramic-cored composite which allows for the assembly of standard or non-standard shaped panels which are cut to fit using diamond saw equipment which, in turn, enables workers unskilled in the art to expeditiously install the ceramic-cored composite panels into existing equipment.

Yet another object of the present invention is to provide a new and improved ceramic-cored composite that, whether incorporated into a newly finished component or retrofitted into a worn part, will yield a lower total weight of the finished component when compared to existing techniques.

An even further object of the present invention is to provide a new and improved ceramic-cored composite which is susceptible of a low cost of manufacture with regard to both materials and labor and requires less reliance on technician skill, which accordingly is then susceptible of low prices of sale to the consuming industry, thereby making such composites economically available to the buying industry.

Still a further object of the present invention is to provide a new and improved ceramic-cored composite having a lower coefficient of friction than existing composites, hence providing better product flow and less tendency to accumulate and interrupt production. The effect of slight planar irregularities in the surface of the ceramic layer is minimized on the wearing surface of the subject invention by a predetermined sequence of construction whereby the ceramic is arranged on a flat surface and the supporting layers of fiberglass and foam are thereon laid.

These, together with other objects of the present invention, along with the various features of novelty which characterize the invention, are accomplished through the use of a plurality of coextensive consecutively arranged generally planar layers of material, the layers consisting of a ceramic layer; a first FRP composite layer; an energy absorbing resilient structural core layer for absorbing impact energy imparted indirectly thereto by heavy abrasive materials; and a second FRP composite layer, wherein the layers are consecutively bonded together in the order set out above by an adequate amount of adhesive.

Once the construction of the ceramic-cored composite is complete, several methods exist for attaching it to various sites of wear inside a component or to a newly finished component. Typically, a plurality of panels are required in a worn component thus creating a mosaic of composite panel protection for the component. First, each ceramic-cored composite panel may be bonded to a metal substrate using any number of adhesives such as, but not limited to epoxy, urethane, Portland cement, polyesters, and silicone based adhesives. Second, each panel may depend on mechanical containment such as a "keyed arch" wherein each panel rests or abuts against another in a position that prevents the removal of each individual panel. This results in forces being applied to adjacent panels or metal structure sufficient to block the removal effort. Lately, each panel may utilize a form of mechanical attachment whereby a tapered metal insert is fitted into a countersunk hole through each panel. The metal insert is then welded to the metal substrate thereby holding the panel to the metal as would a countersunk screw. In fact, countersunk screws and bolts are occasionally used in place of the above-mentioned weldable insert. Moreover, each panel may be fitted with threaded studs or internally threaded inserts which are then bolted to a base structure through pre-drilled holes.

Other novel features of the present invention will become apparent from a study of the drawing and the description of the preferred embodiment.

BRIEF DESCRIPTION OF THE DRAWINGS

Constructions embodying features of my invention are depicted in the accompanying drawings which form a portion of this disclosure and wherein:

FIG. 6 is a graphic representation of the deflection of a panel made using the invention when placed under a load;

FIG. 7 is a graphic representation as in FIG. 6, illustrating deflection under a different load.

BEST MODE OF THE INVENTION

Figure 1:
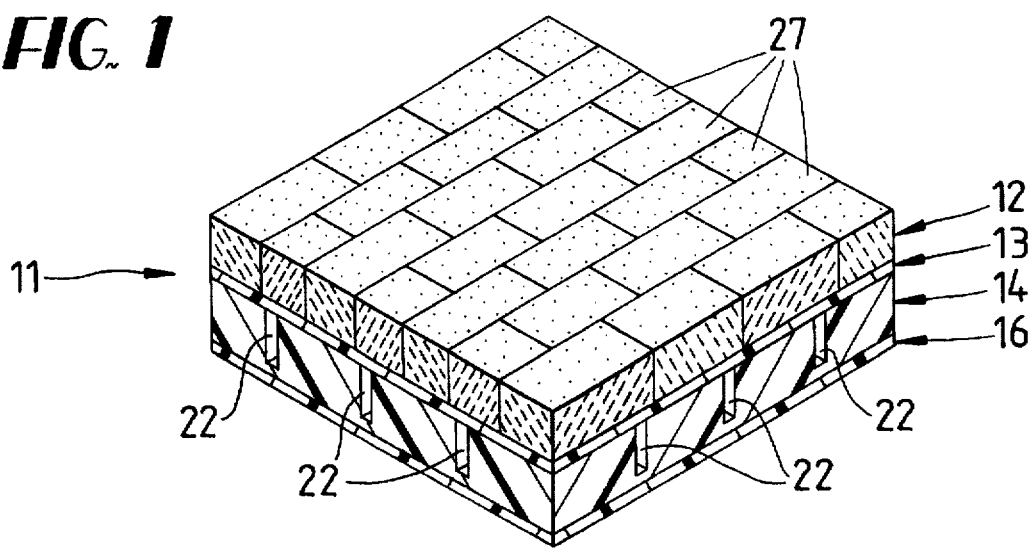
FIG. 1 is a perspective view showing various layers of the present invention.

Referring to the drawings for a clearer understanding of the present invention, it should be noted in FIGS. 1–4 that the improved ceramic-cored composite panel, which is the subject of this application, is generally designated by the reference numeral and contemplates use in equipment exposed to heavy abrasive materials such as chutes, conveyors, tanks, cyclone-type separation devices, fan housings, guides and hoppers (not shown). Note, however, that the present invention may also be used in equipment exposed to light abrasive materials such as grain chutes, conveyors or elevators (not shown).

Figure 2:
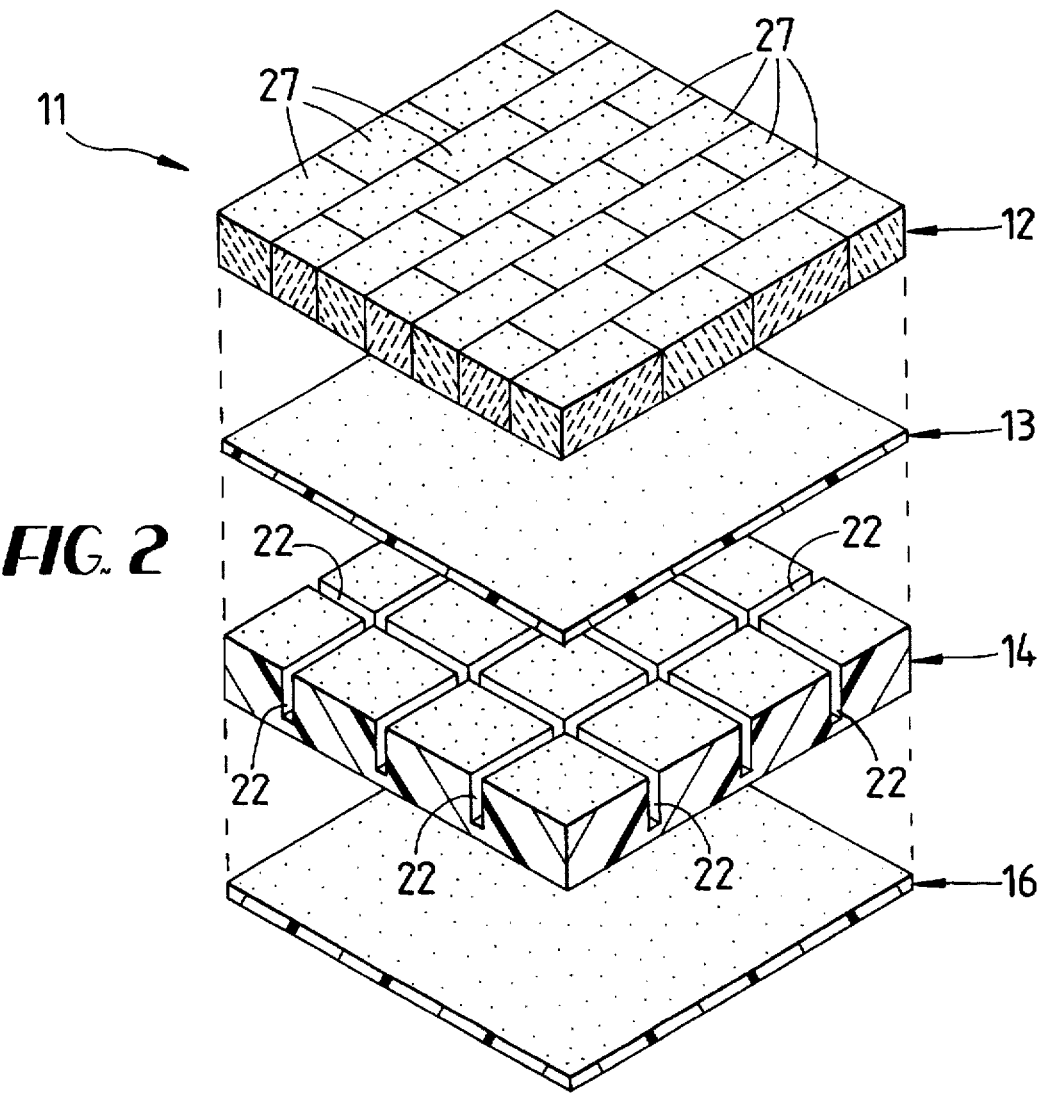
FIG. 2 is an exploded perspective view showing various layers of the invention.
Figure 3:
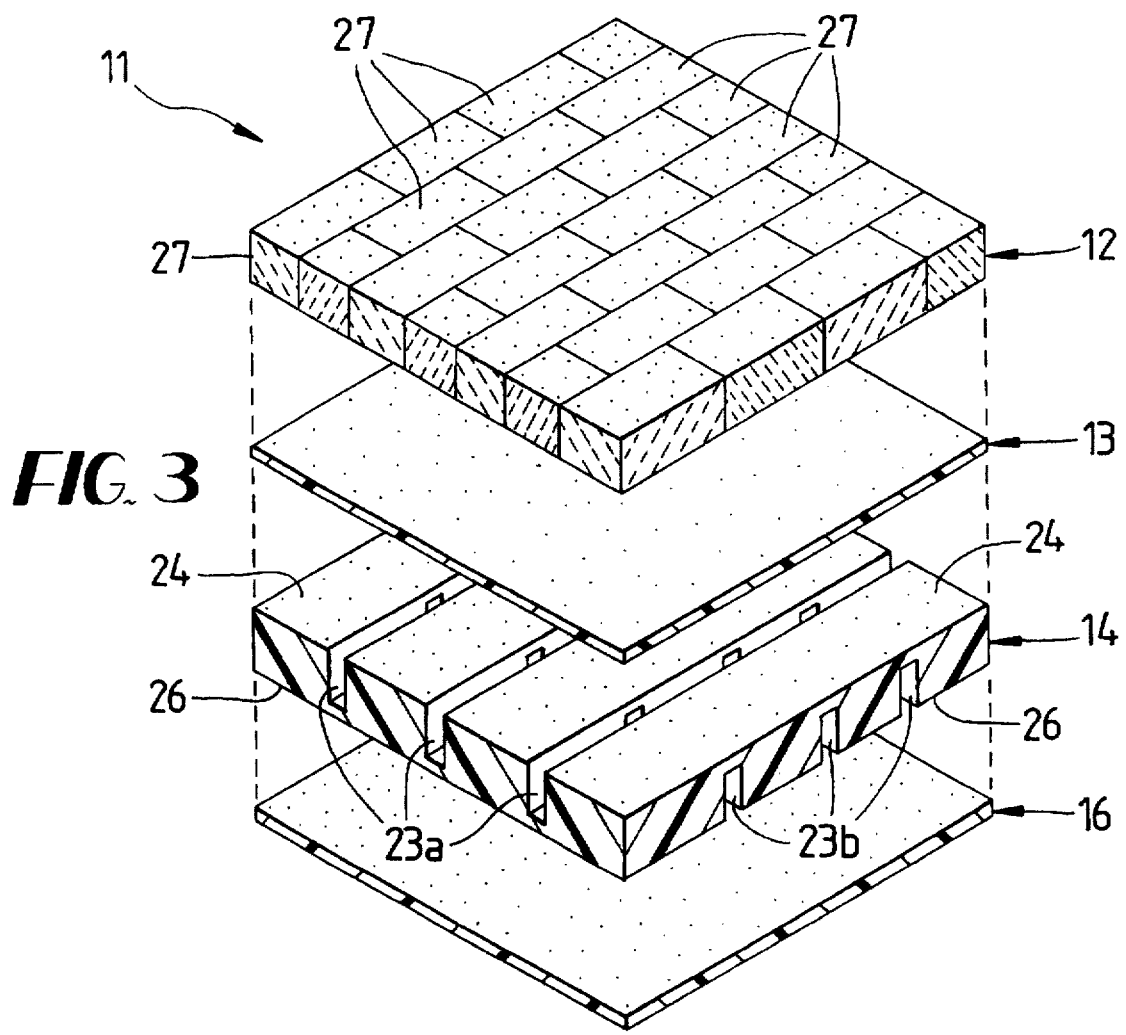
FIG. 3 is an exploded perspective view showing the various layers of a second embodiment of the present invention.
Figure 4:
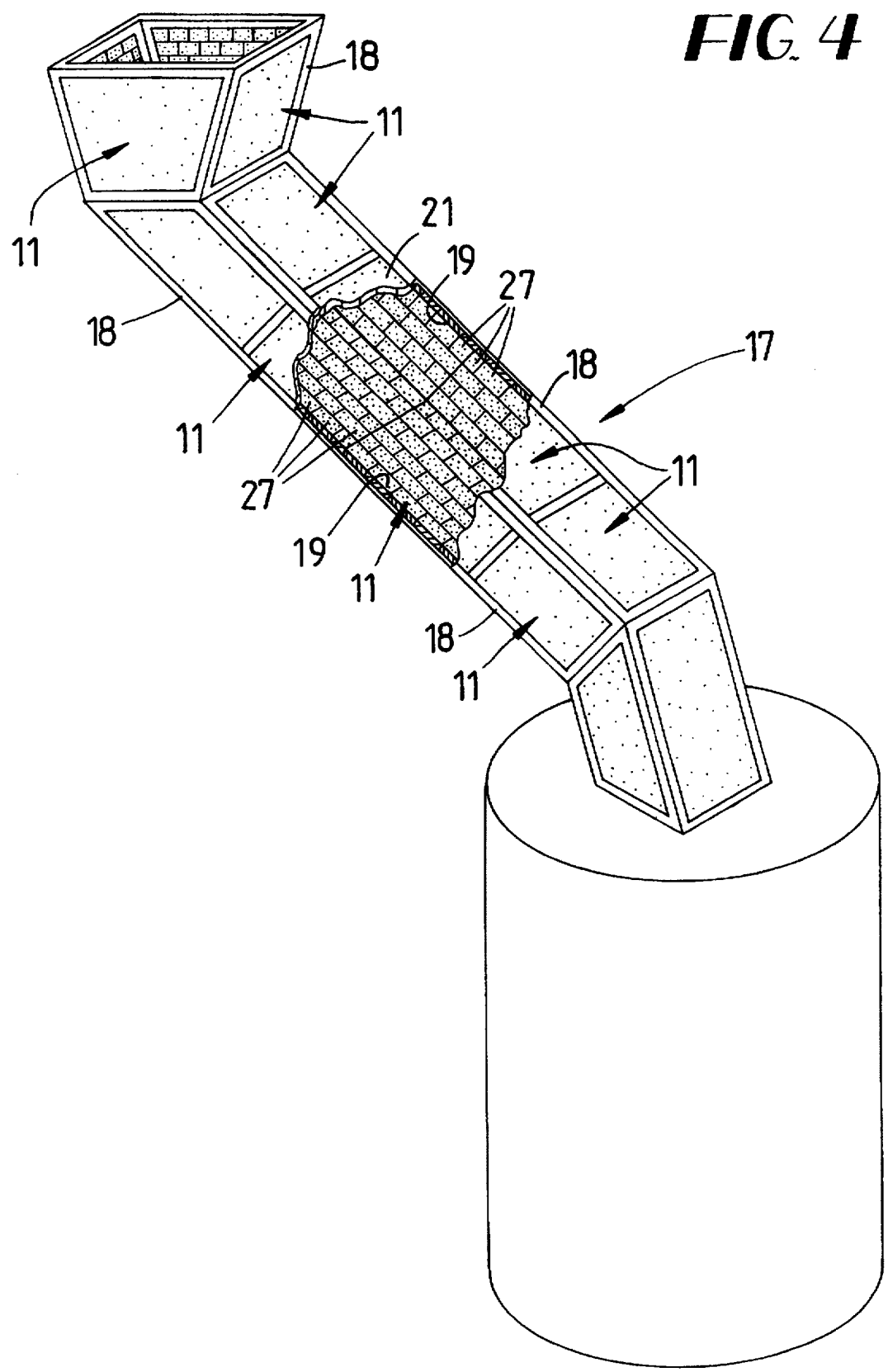
FIG. 4 is a perspective view showing the present invention installed in a chute.

As illustrated in FIGS. 1–3, the ceramic-cored composite panel is comprised of a plurality of uniformly shaped generally planar layers of materials wherein each layer has a specific contribution or purpose in the overall function of panel 11.

Figure 5:
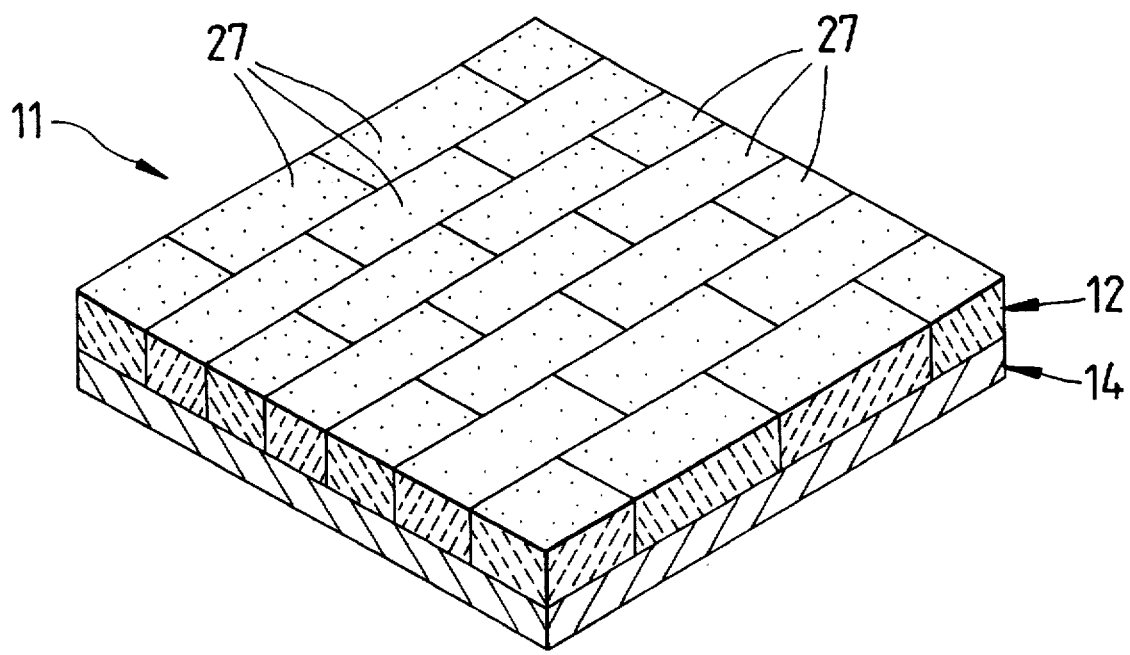
FIG. 5 is a perspective view showing the various layers of a third embodiment of the present invention.

The layers of the present invention are comprised of and generally arranged in the following sequential or consecutive order: a ceramic layer 12; a first FRP composite layer 13; a resilient core layer 14; and a second FRP composite layer 16. This particular arrangement of layers illustrates a preferred embodiment, however, it is to be understood that the exact consistency or arrangement of the layers may change to meet certain requirements for specific equipment, abrasive materials and/or environmental conditions encountered. Such situations, for example, may require a thicker panel 11 in some types of equipment as compared to others so as to maximize exposure of the ceramic layer 12 to the abrasive materials. Likewise, the condition of the environment and types of abrasive materials are factors to be considered when determining the size and consistency of the panel 11. For instance, as shown in FIG. 5, the panel 11 in a grain chute (not shown) would be comprised of a ceramic layer 12 and a resilient layer 14 made from paper since the impact energy of grain is less than other materials such as coal.

As shown in FIGS. 1–3, each layer 12, 13, 14 and 16 is typically manufactured into a standard shape such as a square or rectangle since standard shaped panels lend themselves more easily to automated manufacturing in an assembly line rather than by the one-at-a-time method currently used in the art. It is important to note, however, that any non-standard shape may be obtained if the situation warrants.

The length and width of layers 12, 13, 14 and 16 is at least 4 inches by 4 inches, respectively, but may be considerably larger depending on whether the panel 11 is used as a wear-resistant liner secured to some type of structural backing or is used as a structural member itself. Illustrating the later instance, FIG. 4 discloses a chute 17 comprising a structural frame 18 and ceramic-cored composite panels 11 as wall members wherein the ceramic layers 12 define the inner surface 19 of the wall members. As a result, the second FRP composite layers 16 define the outer surface 21 of each respective wall member. Therefore, it is to be understood that the size of the panels 11 are predetermined in order to meet specific size requirements for certain types of equipment.

Moreover, the general overall thickness of panel 11 ranges from approximately 0.25 inches to 2 inches. Again, however, this size may be larger if the situation warrants. More specifically, the thickness of the ceramic layer 12 must be at least 0.125 inches. Each FRP composite layer 13 and 16 must have a thickness of at least 0.020 inches and the thickness of the resilient core layer 14 is typically 0.125 inches to 1.0 inches.

The ceramic layer 12 used in the practice of the invention is normally an alumina based ceramic which is well known in the art and is in widespread commercial use. Normally, it is composed of a plurality of contiguously arranged ceramic tiles 27 and is not limited to any specific alumina based formulation or additive ingredients for the formulation thereof, but, contains for illustration purposes only at least 85 percent by weight aluminum oxide and the remainder being small amounts of mineralizers or glass forming oxides.

Additionally, other ceramic materials could be used which are comprised of other oxides and composites such as zirconia, silicon carbides, alumina zirconia-silica, and alumina silicon carbide combinations. This includes ceramic/polymer castings where a wear surface is created by binding small particles in a matrix of a thermosetting resin including, but not limited to epoxy, polyesters, furan, vinylesters, merthacrylates, Portland cement, and silicate cements.

The first and second FRP composite layers 13 and 16 are typically a woven, stitched mat, or chopped mats made of glass, carbon graphite, kevlar or other suitable fibers of a similar category.

The resilient core layer 14 is generally selected from the group consisting of polyvinyl chloride, polyurethane, polyethylene or polystyrene. As shown in FIG. 2, resilient core layer 14 defines a plurality of spaced perpendicular grooves 22 therein for allowing the migration and accumulation of a sufficient amount of adhesive thereon for adequate bonding to the first and second FRP composite layers 13 and 16. The grooves 22, when filled with a rigid polymer, create a beam perpendicular to the plane of the adjacent FRP composite layers 13 and 16 respectively which adds great stiffness by reducing the panel's tendency for flexing as does the web of an I-Beam. It should be noted, however, that the grooves 22 do not have to be perpendicular, nor do they have to span the entire length of resilient core layer 14.

A second embodiment of resilient core layer 14 is shown in FIG. 3 wherein the plurality of spaced grooves 22 define a first matrix 23a of spaced parallel grooves on an upper surface 24 of resilient core layer 14 and a second matrix 23b of spaced parallel grooves in perpendicular opposing relation to the first matrix 23a on a lower surface 26 of the resilient core layer 14. This configuration of grooves 23a and 23b enhances even further the migration and accumulation of a sufficient amount of adhesive throughout the resilient core layer 14 enabling improved bonding, rigidity and stiffness to the first and second FRP composite layers 13 and 16. Again, the grooves 22 in matrices 23a and 23b do not have to be in perpendicular relation to one another, nor do they have to span the entire length of resilient core layer 14. In fact, situations may exist where no grooves are required.

As noted above, layers 12, 13, 14 and 16 are commensurately shaped and consecutively arranged. Each layer is adhesively bonded to one another by a sufficient amount of adhesive such as a polyurethane, Portland cement, epoxy, polyester or silicone based adhesive. In even greater particularity, the method of constructing panel 11 comprises the steps of: (1) positioning a plurality of contiguously arranged ceramic tiles 27 upon a flat planar surface thus forming ceramic layer 12; (2) applying an adequate layer of adhesive over the entire surface of ceramic layer 12; (3) positioning the first FRP composite layer 13 upon the ceramic layer 12; (4) applying an adequate layer of adhesive over the entire surface of first FRP composite layer 13; (5) positioning the resilient core layer 14 upon the first FRP composite layer 13; (6) applying an adequate layer of adhesive over the entire surface of resilient core layer 14; (7) positioning the second FRP composite layer upon the resilient core layer 14; (8) solidifying the adhesive; and (9) cutting the panel 11 into a predetermined shape using a diamond bladed saw (not shown).

After assembly of the panel 11 in the manner described above, it is important to note the novel characteristics of the combination of layers 12, 13, 14 and 16. As stated earlier, the purpose of the first ceramic layer 12 is to provide superior wear or abrasion resistance to the panel 11 since ceramic is preferred over traditional metal parts because of its superior wearing characteristics.

The purpose of each FRP composite layer 13 and 16 is to provide additional stiffness and rigidity to panel 11 which transfers dynamic loading over a greater area to the underlying support structure and resilient core layer 14 thus avoiding concentrations of stress in the area of impact. However, it should be noted that the use of the FRP composite layers 13 and 16 allows panel 11 to be utilized without an underlying support structure since it is well known in the art that FRP adds structural integrity to devices in which it is utilized. As stated earlier, this concept is demonstrated in FIG. 4 wherein a chute 17 is comprised of structural frame members 18 and ceramic-cored composite panels 11 as walls for the chute 17. Such a chute 17 not only has a greatly reduced weight when compared to existing metal chutes, but also has all of the advantages of ceramic-cored composites as described throughout this application.

The primary purpose of the resilient core layer 14 is to absorb impact energy transmitted thereto via the other layers 12, 13 and 16 by the impact of the abrasive materials. Resilient core layer 14 also contributes to the overall stiffness of panel 11 by increasing its cross sectional modulus while adding a negligible amount of weight. In this regard, it is ostensibly noteworthy to refer to FIG. 6, wherein I have depicted the deflection of the panel under a load condition. As may be seen a 30" by 48" panel of my composition when supported solely about the edges thereof and loaded with a load equivalent to two pound per square inch (2880 pounds supported on the panel) permits deflection of the panel of about 0.22 inches in the central area C of the panel, 0.175 in an anulus M about the central area, diminishing to a deflection of 0.044 inches in a region R near the outer edges, without damage to the ceramic layer. In FIG. 7, I depict loading the same panel with 250 pounds on a 4"×4" centered area, yielding a deflection of 0.08 inches in central area C, 0.065 inches at A, and 0.016 inches at R.

In addition, the combination of the layers 12, 13, 14 and 16, when secured to equipment, enables the equipment to require less externally supplied radiant energy (radiant heaters) for continued operation since the combination acts as an insulator and does not conduct away thermal energy. Once the construction of the panel 11 is complete, several methods exist for attaching or securing it to various sites of wear inside a worn component or to a newly fabricated component. Typically, a plurality of panels 11 are required in a component thus creating a mosaic of composite panel 11 protection.

First, each panel 11 may be bonded to a substrate using any of the adhesives mentioned earlier. This normally consists of bonding the exposed outer surface of the second FRP composite layer 16 directly to a worn area of the equipment. This step is repeated until the surface in question is covered by a mosaic of panels 11.

Second, each panel 11 may depend on a "keyed arch" panel (not shown) wherein each panel 11 abuts another. This results in forces being applied to adjacent panels or underlying structure which are sufficient to block the removal effort.

Lastly, each panel 11 may utilize a form of mechanical attachment whereby a hollow tapered metal insert is fitted into a similarly tapered countersunk hole defined in each panel 11. The metal insert is then welded to the metal substrate thereby holding the panel 11 to the metal substrate as would a countersunk screw. In fact, countersunk screws and bolts may be used in place of the weldable insert.

From the foregoing, it should be clear that the present invention represents a substantial improvement over the prior art.

While I have shown my invention in several forms, it will be obvious to those skilled in the art that it is not so limited but is susceptible of various changes and modifications without departing from the spirit thereof.

What I claim as my invention is:

1. A dynamically loaded surface wear resistant structural member for use in material transfer apparatus, consisting of the combination of:
   a) a ceramic layer comprising a plurality of abutting ceramic tiles of a ceramic material selected from the group consisting of alumina based ceramics, with each tile having a minimum thickness of at least 0.125 inches in a planar array said tiles in said ceramic layer being bonded to each other by a layer of adhesive covering the entire bottom surface of said ceramic layer;
   b) a fiberglass reinforced plastic composite layer having a thickness of at least 0.20 inches bonded by said adhesive to each tile in said planar array in planar abutment therewith;
   c) resilient core layer of material selected from the group consisting of polyvinyl chloride, polyurethane, polyethylene or polystyrene having a thickness of between about 0.125 inches and about 1.0 inches bonded to said fiberglass reinforced plastic composite layer in planar abutment therewith;
   d) a second fiberglass reinforced plastic composite layer having a thickness of at least 0.20 inches adhesively bonded to said core layer; wherein said structural member deflects without breaking said ceramic layer under a load of 2 pounds per square inch on a 48 inch by 30 inch unit of said member supported only at the edges of said member.

2. A dynamically loaded surface wear resistant structural member for use in material transfer apparatus, comprising in combination:
   a) a ceramic layer comprising a plurality of abutting ceramic tiles in a planar array having a layer of adhesive applied covering the entire bottom surface of said ceramic layer;
   b) a fiber reinforced plastic composite layer adhesively bonded to said planar array in planar abutment therewith;
   c) a resilient core layer bonded to said fiber reinforced plastic composite layer in planar abutment therewith;
   d) a second fiber reinforced plastic composite layer, adhesively bonded to said core layer;
   e) means for supporting said member permitting deflection of said member under loads of at least 2 pounds per square inch normal to said planar array.

3. A ceramic-cored composite panel as defined in claim 1 wherein said resilient core layer defines a plurality of spaced grooves therein for enhancing the migration and accumulation of a sufficient amount of said adhesive thereon enabling adequate bonding to said first and second fiberglass reinforced plastic composite layers and for providing additional stiffness and rigidity to said composite panel.

4. A dynamically loaded surface wear resistant structural surface member for use in material transfer apparatus, consisting of the combination of:
   a) a layer of discrete ceramic tiles of a ceramic material selected from the group consisting of alumina base ceramics, with each tile having a uniform minimum thickness of at least 0.125 inches, said tiles being contiguous in a planar array;
   b) a layer of adhesive covering the entire bottom surface of said layer of discrete ceramic tiles;
   c) a first fiber reinforced plastic layer integrated with said layer of adhesive and coextensive with said layer of ceramic tiles;
   d) a resilient core layer adhesively bonded to said fiberglass reinforced plastic composite layer in planar abutment therewith;
   e) a second fiberglass reinforced plastic composite layer adhesively bonded to said core layer; wherein said structural member has sufficient resilience to withstand impact to said ceramic layer by the flow of materials thereover without destruction of said discrete tiles.

* * * * *